Sept. 20, 1932. H. R. RICARDO 1,878,325
MEANS FOR FACILITATING STARTING OF INTERNAL COMBUSTION ENGINES
OF THE LIQUID FUEL INJECTION COMPRESSION IGNITION TYPE
Filed May 27, 1931
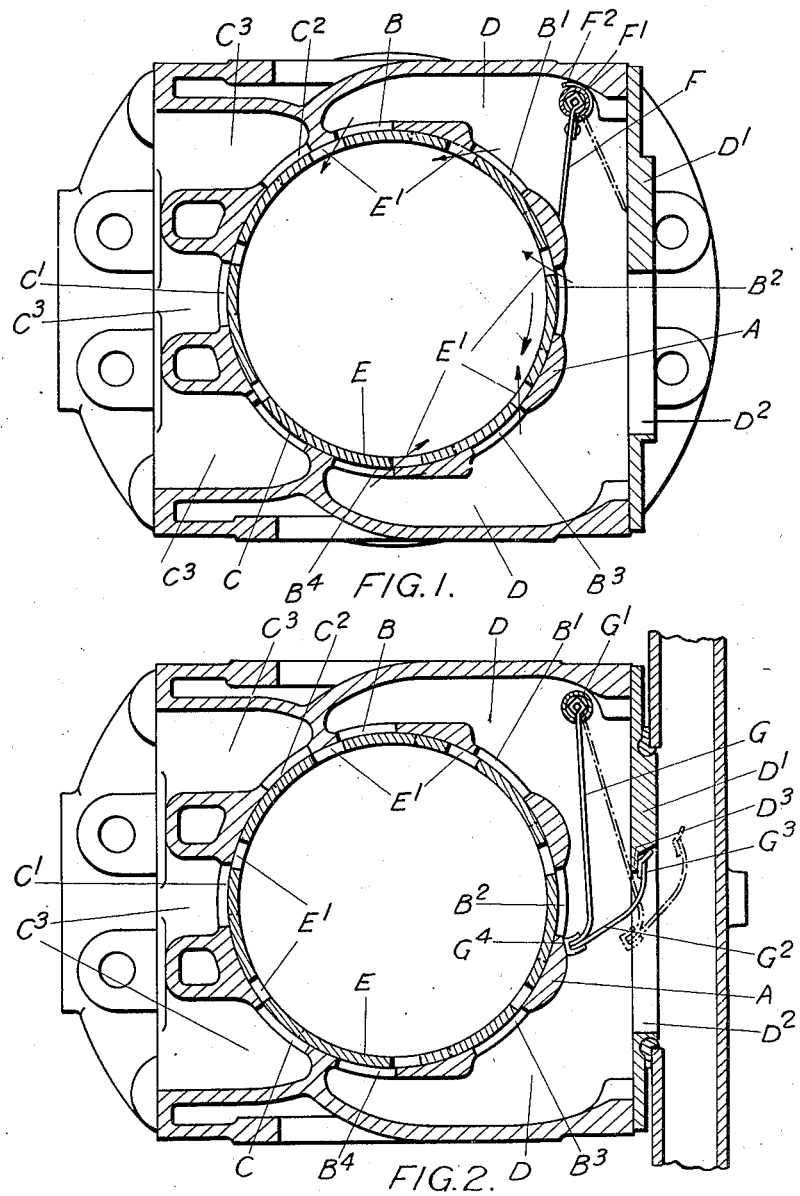

Patented Sept. 20, 1932

1,878,325

UNITED STATES PATENT OFFICE

HARRY RALPH RICARDO, OF LONDON, ENGLAND

MEANS FOR FACILITATING STARTING OF INTERNAL COMBUSTION ENGINES OF THE LIQUID FUEL INJECTION COMPRESSION IGNITION TYPE

Application filed May 27, 1931, Serial No. 540,436, and in Great Britain June 24, 1930.

This invention relates to internal combustion engines of the liquid fuel injection compression ignition type in which the air charge or a part thereof enters the cylinder during the induction period through a number of inlet ports in the cylinder wall in such a manner as to cause the whole of this charge to be in a state of rotation about the cylinder axis at the end of the induction stroke and during the whole of the compression stroke, the fuel being injected at the end of the compression stroke into this rotating air charge.

In such engines although the rapid rotation of the air charge is advantageous during normal operation of the engine, during the starting period it causes a rapid transference of heat from the rotating air charge to the cool walls of the cylinder and combustion chamber with the result that this charge tends to become unduly cooled and starting is rendered difficult. The object of the present invention is to facilitate the starting of such engines.

To this end in an engine of the above general type according to the present invention means are provided for restricting or cutting off the flow of air through one or more of the inlet ports in the cylinder wall for the purpose of reducing the speed of rotation of the air charge and hence the amount of heat transmitted therefrom to the cylinder and combustion chamber walls during the starting period.

The invention is particularly applicable to engines provided with two inlet ports or sets of inlet ports so formed and arranged in the cylinder wall that the portion of the air charge entering through one inlet port or set of inlet ports has a greater tendency to cause rotation of the whole air charge about the cylinder axis, than has the portion of the air charge entering through the other inlet port or set of inlet ports and in this case means are preferably provided for cutting off or reducing during the starting period the flow of air through the inlet port or set of inlet ports having the greater tendency to cause rotation of the air charge.

Thus the invention may conveniently be applied to an internal combustion engine of the kind having a plurality of inlet ports spaced around the cylinder wall and so controlled in known manner by a sleeve valve having a combined oscillating and reciprocating motion that the air charge entering the cylinder through these ports will tend to rotate about the cylinder axis, the induction belt being provided with an inlet opening so placed therein that the portion of the charge entering the cylinder through the inlet port or ports situated towards one end of the induction belt has a greater tendency to rotate about the cylinder axis than that portion of the charge which enters the cylinder through the port or ports situated towards the other end of the induction belt. When the invention is applied to such an engine a valve is conveniently provided in the induction belt for cutting off communication between the inlet opening and the part of the belt in which lie the ports through which normally enters the part of the air charge having the greater tendency to rotate about the cylinder axis.

The invention may be carried into practice in various ways but two alternative constructions according to this invention are illustrated by way of example in the accompanying drawing, in which Figure 1 is a section through the cylinder of an internal combustion engine to which one form of the present invention is applied, the section being taken in the plane in which lie the inlet and exhaust ports, and Figure 2 is a similar view to Figure 1 showing an alternative construction according to this invention.

In the construction illustrated in Figure 1 the cylinder A of the engine is provided with a series of inlet ports B, $B^1$, $B^2$, $B^3$ and $B^4$, and a series of exhaust ports C, $C^1$, $C^2$. The inlet ports communicate with an induction belt D which is formed in the cylinder casting and has its open side closed by a plate $D^1$ provided with an inlet opening $D^2$, while the exhaust ports communicate with exhaust passages $C^3$ also formed in the cylinder casting. Disposed within the cylinder A is a sleeve valve E having ports $E^1$ therein, this sleeve valve having imparted to it in known manner a combined oscillating and reciprocating movement such that during the final closing of the exhaust ports and the initial opening of the inlet ports, the movement of the valve is mainly oscillatory. In the construction shown the direction of oscillation of the sleeve valve during the initial opening movement of the inlet ports is as shown by the arrow, and it will be seen that during this initial opening movement the charge tends to enter the cylinder through the inlet ports B, B¹, B², B³ and B⁴ in the cylinder A and the corresponding ports in the sleeve E, substantially tangentially so as to rotate rapidly about the cylinder axis. Since, during the closing movement of the inlet ports, the movement of the valve E is mainly reciprocating, the charge does not enter the cylinder during any portion of the inlet period in a direction tending to check this rotation to any great extent with the result that rapid rotation of the charge takes place in the cylinder during the whole of the induction and compression strokes. Such rapid rotation of the air charge is advantageous during normal operation of a compression ignition fuel injection engine of the type to which the present invention relates, but during the starting period this rotation causes a rapid transference of heat from the rotating air charge to the cool walls of the cylinder and combustion chamber, with the result that the charge tends to become unduly cooled and starting is rendered difficult. To overcome this difficulty there is arranged in the induction belt D a flap valve F formed, for example, of sheet metal, this valve being pivoted at F¹ and adapted to lie either in an inoperative position as indicated in dotted lines, or in an operative position as shown in full lines in which it extends across the induction belt so as to cut off communication between the inlet opening D² and the portion of the induction belt with which communicate the two inlet ports B and B¹. The valve F carries a curved leaf spring F² which bears against the wall of the induction belt D and serves to hold the valve frictionally in whichever of its two positions it is set.

In the construction shown in Figure 1 it will be seen that the air charge entering through the inlet opening D² will flow towards the inlet ports B, B¹ and B² in a direction tending to assist the tangential entry of the air into the cylinder through these ports during the inital part of the inlet period and also tending to cause tangential entry of the air through such ports during the remaining part of the induction period. The air flowing through the inlet opening D² to the remaining two inlet ports B³ and B⁴ on the other hand will approach these ports in a direction tending to check the tangential flow of air into the cylinder through these ports during the initial opening of the ports and to cause the air to flow through these ports during at least a part of the induction stroke in a tangential direction opposite to that in which the tangential flow takes place during the initial portion of the induction stroke.

It will thus be seen that, considering the whole induction period, the charge entering through the ports B, B¹ and B² has a greater effect in causing rotation of the charge about the cylinder axis than the portion of the charge entering through the ports B³ and B⁴. Thus, by cutting off the ports B and B¹ from the inlet D² by means of the valve F during the starting period, the speed of rotation of the charge within the cylinder at the end of each induction stroke will be reduced, thus reducing the transference of heat from this charge to the cylinder and combustion chamber walls and assisting starting.

In the construction illustrated in Figure 2 the arrangement of the cylinder A with the inlet and exhaust ports B, B¹, B², B³, B⁴, C, C¹, C², the induction belt D and the exhaust passages C³ and also of the sleeve valve E, is similar to that shown in Figure 1. In the construction shown in Figure 2, however, a flap valve G pivoted at G¹ in the induction belt is adapted to cut off communication between the inlet opening D² and the three inlet ports B, B¹ and B². This valve comprises two parts, one, G, of which is connected to the pivot G¹ while the other, G², is connected to the free end or "nose" of the part G as shown and extends away from the part G so that when the connected end portions of the parts G and G² are moved into contact with the cylinder A, the free edge G³ of the part G² engages a shoulder D³ on the plate D¹ in which is formed the inlet opening D². Some suitable packing G⁴ such as leather, felt or rubber is preferably provided on the "nose" formed where the two parts G and G² are united, and also on the free edge of the part G² or on the shoulder D² so as to form good joints between the members G and G² and the parts with which they engage.

In the construction shown in Figure 2 it will be seen that when the flap valve G is in the position shown in full lines, it will cut off communication between the inlet opening D² and all three of the inlet ports B, B¹ and B² so that only the inlet ports B³ and B⁴ are operative, thereby reducing to a considerable extent the rotational motion which is imparted to the charge within the cylinder during the induction period. Further, the part G² acts as a guide or deflector to assist the smooth flow of the air entering through the opening D¹ and flowing to and through the inlet ports B³ and B⁴. When the flap valve G is in its inoperative position as shown in dotted lines, on the other hand, it will tend to prevent flow through one side of the inlet opening D² and thus cause flow of air to and through the port B² in a more nearly truly tangential direction than would otherwise be the case, so that when the valve member G is in its inoperative position it tends to assist the entry of the air through the port B² in such a manner as to cause rotation of the air charge about the cylinder axis so that during normal running of the engine with the valve G inoperative the desired rapid rotation of the charge about the cylinder axis is effected.

It will be understood that the constructions illustrated are given by way of example only and that constructional details may be modified without departing from this invention.

What I claim as my invention and desire to secure by Letters Patent is:—

1. An internal combustion engine of the liquid fuel injection compression ignition type in which at least a part of the charge enters the cylinder during the induction period in such a manner as to cause the whole charge to be in a state of rotation about the combustion chamber axis at the end of the compression stroke, including in combination a cylinder having a plurality of inlet ports in its wall through which the charge enters the cylinder during normal operation of the engine in such a manner as to tend to rotate about the cylinder axis, and means for cutting off at least partially the flow of air through at least one of these ports for the purpose of reducing the speed of rotation of the charge during the starting period.

2. An internal combustion engine of the liquid fuel injection compression ignition type in which at least a part of the charge enters the cylinder during the induction period in such a manner as to cause the whole charge to be in a state of rotation about the combustion chamber axis at the end of the compression stroke, including in combination a cylinder having a plurality of inlet ports in its wall through which the charge enters the cylinder during normal operation of the engine in such a manner as to tend to rotate about the cylinder axis, the arrangement being such that the portion of the charge entering through at least one of the inlet ports has a greater tendency to cause rotation of the whole charge about the cylinder axis than has the portion of the charge entering through at least one other port, and means for cutting off at least partially the flow of air through the port having the greater rotational effect on the charge for the purpose of reducing the speed of rotation of the charge about the cylinder axis during the starting period.

3. An internal combustion engine of the liquid fuel injection compression ignition type in which at least a part of the charge enters the cylinder during the induction period in such a manner as to cause the whole charge to be in a state of rotation about the combustion chamber axis at the end of the compression stroke, including in combination a cylinder having a plurality of inlet ports in its wall through which the charge enters the cylinder during normal operation of the engine, an induction belt with which the ports communicate having an inlet opening, a sleeve valve in the cylinder having a combined oscillating and reciprocating movement imparted thereto, this valve controlling the ports so that the air charge entering the cylinder through the ports tends to rotate about the cylinder axis, the air entering through the port or ports situated towards one end of the induction belt having a greater tendency to cause rotation of the whole charge about the combustion chamber axis than that entering through the port or ports situated towards the other end of the induction belt, and a valve for cutting off at least partially communication between the inlet opening and the part of the induction belt in which lie the ports through which the portion of the charge having the greater rotational tendency normally enters the cylinder for the purpose of reducing the speed of rotation of the charge about the cylinder axis during the starting period.

4. An internal combustion engine of the liquid fuel injection compression ignition type in which at least a part of the charge enters the cylinder during the induction period in such a manner as to cause the whole charge to be in a state of rotation about the combustion chamber axis at the end of the compression stroke, including in combination a cylinder having a plurality of inlet ports in its wall through which the charge enters the cylinder during normal operation of the engine, an induction belt with which the ports communicate having an inlet opening, a sleeve valve in the cylinder having a combined oscillating and reciprocating movement imparted thereto and controlling the ports so that the air charge entering the cylinder through these ports tends to rotate about the cylinder axis, the air entering through the port or ports situated towards one end of the induction belt having a greater tendency to cause rotation of the whole charge about the combustion chamber axis than that entering through the port or ports situated towards the other end of the induction belt, and a valve comprising a plate pivoted at a point adjacent to one wall of the induction belt and adapted when in its operative position to extend across the induction belt and make contact with the other and opposite wall thereof so as to cut off communication between the inlet opening and the part of the induction belt in which lie the ports through which the part of the charge having the greater rotational tendency normally enters the cylinder.

5. An internal combustion engine of the liquid fuel injection compression ignition type in which at least a part of the charge enters the cylinder during the induction period in such a manner as to cause the whole charge to be in a state of rotation about the combustion chamber axis at the end of the compression stroke, including in combination a cylinder having a plurality of inlet ports in its wall through which the charge enters the cylinder during normal operation of the engine, an induction belt with which the ports communicate having an inlet opening, a sleeve valve in the cylinder having a combined oscillating and reciprocating movement imparted thereto and controlling the ports so that the air charge entering the cylinder through these ports tends to rotate about the cylinder axis, and a valve comprising a plate pivoted at a point adjacent to one wall of the induction belt and adapted when in its operative position to extend across the induction belt and make contact with the other and opposite wall thereof so as to cut off communication between at least one of the inlet ports and the inlet opening for the purpose of reducing the speed of rotation of the charge about the cylinder axis during the starting period.

6. An internal combustion engine of the liquid fuel injection compression ignition type in which at least a part of the charge enters the cylinder during the induction period in such a manner as to cause the whole charge to be in a state of rotation about the combustion chamber axis at the end of the compression stroke, including in combination a cylinder having at least three inlet ports spaced around its wall, an induction belt with which the inlet ports communicate having an inlet opening, a sleeve valve controlling the inlet ports and having a combined oscillating and reciprocating movement imparted thereto so that the air charge entering the cylinder through the inlet ports tends to rotate about the cylinder axis, the air entering through the ports situated towards one end of the induction belt and constituting the majority of the inlet ports having a greater tendency to rotate about the combustion chamber axis than that entering through the smaller number of ports situated towards the other end of the induction belt, and a valve comprising a plate pivoted at a point adjacent to one wall of the induction belt and adapted when in its operative position to extend across the induction belt and make contact with the other and opposite wall thereof so as to cut off communication between the inlet opening and the said majority of the inlet ports through which the part of the charge having the greater rotational tendency normally enters the cylinder.

In testimony whereof I have signed my name to this specification.

HARRY RALPH RICARDO.